US008548729B2

(12) United States Patent
Mizuguchi

(10) Patent No.: US 8,548,729 B2
(45) Date of Patent: Oct. 1, 2013

(54) RADIO APPARATUS MOUNTED ON A VEHICLE

(75) Inventor: Takao Mizuguchi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/425,205

(22) Filed: Mar. 20, 2012

(65) Prior Publication Data

US 2012/0239286 A1 Sep. 20, 2012

Related U.S. Application Data

(63) Continuation of application No. PCT/JP2010/070288, filed on Nov. 15, 2010.

(30) Foreign Application Priority Data

Nov. 19, 2009 (JP) ................................. 2009-264189
Nov. 12, 2010 (JP) ................................. 2010-253646

(51) Int. Cl.
*G06F 17/10* (2006.01)

(52) U.S. Cl.
USPC ............ 701/301; 701/117; 701/409; 340/903

(58) Field of Classification Search
USPC ................. 701/301, 117, 409; 340/903, 436, 340/988
See application file for complete search history.

(56) References Cited

U.S. PATENT DOCUMENTS

2008/0167821 A1* 7/2008 Breed ........................... 701/301

FOREIGN PATENT DOCUMENTS

| | | | |
|---|---|---|---|
| JP | 2002-190093 | A | 7/2002 |
| JP | 2005-018461 | A | 1/2005 |
| JP | 2005-049914 | A | 2/2005 |
| JP | 2005-173703 | A | 6/2005 |
| JP | 2005-174282 | A | 6/2005 |
| JP | 2007-323184 | A | 12/2007 |
| JP | 2008-097413 | A | 4/2008 |

OTHER PUBLICATIONS

International Search Report (PCT/ISA/210) issued in PCT/JP2010/070288 issued on Feb. 15, 2011.
Written Opinion (PCT/ISA/237) and International Preliminary Report on Patentability (PCT/IB/373) with English translation issued in PCT/JP2010/070288 issued Feb. 15, 2011.

* cited by examiner

*Primary Examiner* — Thomas Black
*Assistant Examiner* — Luke Huynh
(74) *Attorney, Agent, or Firm* — McDermott Will & Emery LLP

(57) ABSTRACT

A positional information acquiring unit acquires positional information of a vehicle. An intersection predicting unit predicts an intersection, which the vehicle will enter, by associating the positional information with map information. An entrance predicting unit acquires the positional information of another vehicle included in a packet signal from a transmitting apparatus mounted on the other vehicle and associates the positional information of the other vehicle with the map information, thereby predicting whether the other vehicle enters the intersection predicted by the intersection predicting unit. When entrance of the other vehicle is predicted, an effect predicting unit predicts whether travel of the other vehicle has an effect on this vehicle based on traveling direction information of the other vehicle acquired from the packet signal. The notifying unit notifies presence of the other vehicle when presence of the effect is predicted.

10 Claims, 7 Drawing Sheets

RADIO APPARATUS MOUNTED ON A VEHICLE

RELATED APPLICATIONS

This application is a Continuation of International Application No. PCT/JP2010/070288, filed on Nov. 15, 2010, which in turn claims the benefit of Japanese Application No. 2009-264189, filed on Nov. 19, 2009, and Japanese Application No. 2010-253646, filed on Nov. 12, 2010, the disclosures of which Applications are incorporated by reference herein.

BACKGROUND OF THE INVENTION

1. Field of the Invention

The present invention relates to communication technology and especially relates to a radio apparatus mounted on a vehicle.

2. Description of the Related Art

In order to improve safety in driving of the vehicle, technology to transmit alert information to another vehicle using a radio signal is used. A driver of the other vehicle recognizes an approach of the vehicle based on the alert information. For example, when the driver of a certain vehicle inputs the alert information, a transmitting apparatus transmits the alert information to which a current position is added.

When a receiving apparatus receives the alert information, this calculates a distance between the vehicles based on the current position and outputs an alert signal from a speaker only when the distance is not larger than a predetermined distance.

A collision accident between the vehicles is likely to occur at an intersection. Therefore, it is especially important at the intersection to use a radio signal in order to notify another vehicle of presence of its own vehicle. When the number of vehicles, which travel in the vicinity of the intersection, increases, the number of transmitted radio signals also increases. As a result, collision probability between the radio signals increases and the number of radio signals received by the receiving apparatus also increases. In the former case, the radio signal does not arrive at the receiving apparatus, so that alert to another vehicle is not performed. In the latter case, notification is continuously performed, so that the driver is notable to recognize the vehicle to which the driver should pay attention the most. On the other hand, there is a case in which a traffic signal is provided and a case in which the traffic signal is not provided at the intersection. In general, a degree of risk is higher in the latter case than in the former case. Therefore, alert by the radio signal is especially effective in the latter case.

SUMMARY OF THE INVENTION

The present invention is achieved in view of such circumstances and an object thereof is to provide the technology to notify the driver of the approach of another vehicle.

In order to solve the above-described problem, a radio apparatus according to an aspect of the present invention is a radio apparatus mounted on a vehicle, including: an acquiring unit configured to acquire positional information of the vehicle; a first predicting unit configured to predict an intersection, which the vehicle will enter, by associating positional information acquired by the acquiring unit and map information; a second predicting unit configured to predict whether another vehicle enters the intersection predicted by the first predicting unit by acquiring the positional information of the other vehicle included in a packet signal from another radio apparatus mounted on the other vehicle and associating the positional information of the other vehicle with the map information; a third predicting unit configured to predict whether travel of the other vehicle has an effect on this vehicle based on traveling direction information of the other vehicle acquired from the packet signal when the second predicting unit predicts entrance of the other vehicle; and a notifying unit configured to notify presence of the other vehicle when the third predicting unit predicts presence of the effect.

Another aspect of the present invention also is the radio apparatus. The apparatus is a radio apparatus mounted on a vehicle, including: a first acquiring unit configured to acquire positional information of the vehicle; a second acquiring unit configured to acquire traveling direction information of the vehicle; a generating unit configured to generate a packet signal based on the positional information acquired by the first acquiring unit and the traveling direction information acquired by the second acquiring unit; a first detecting unit configured to detect that the vehicle is decelerated such that a traveling speed of the vehicle becomes lower than a threshold; a second detecting unit configured to detect whether the positional information acquired by the first acquiring unit indicates the vicinity of an intersection at which a traffic signal is not provided when the first detecting unit detects deceleration; and a communicating unit configured to transmit the packet signal generated by the generating unit when the second detecting unit detects the deceleration in the vicinity of the intersection at which the traffic signal is not provided.

Meanwhile, optional combination of the above-described components and those obtained by converting representation of the present invention among a method, an apparatus, a system, a recording medium, and a computer program also are effective as an aspect of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
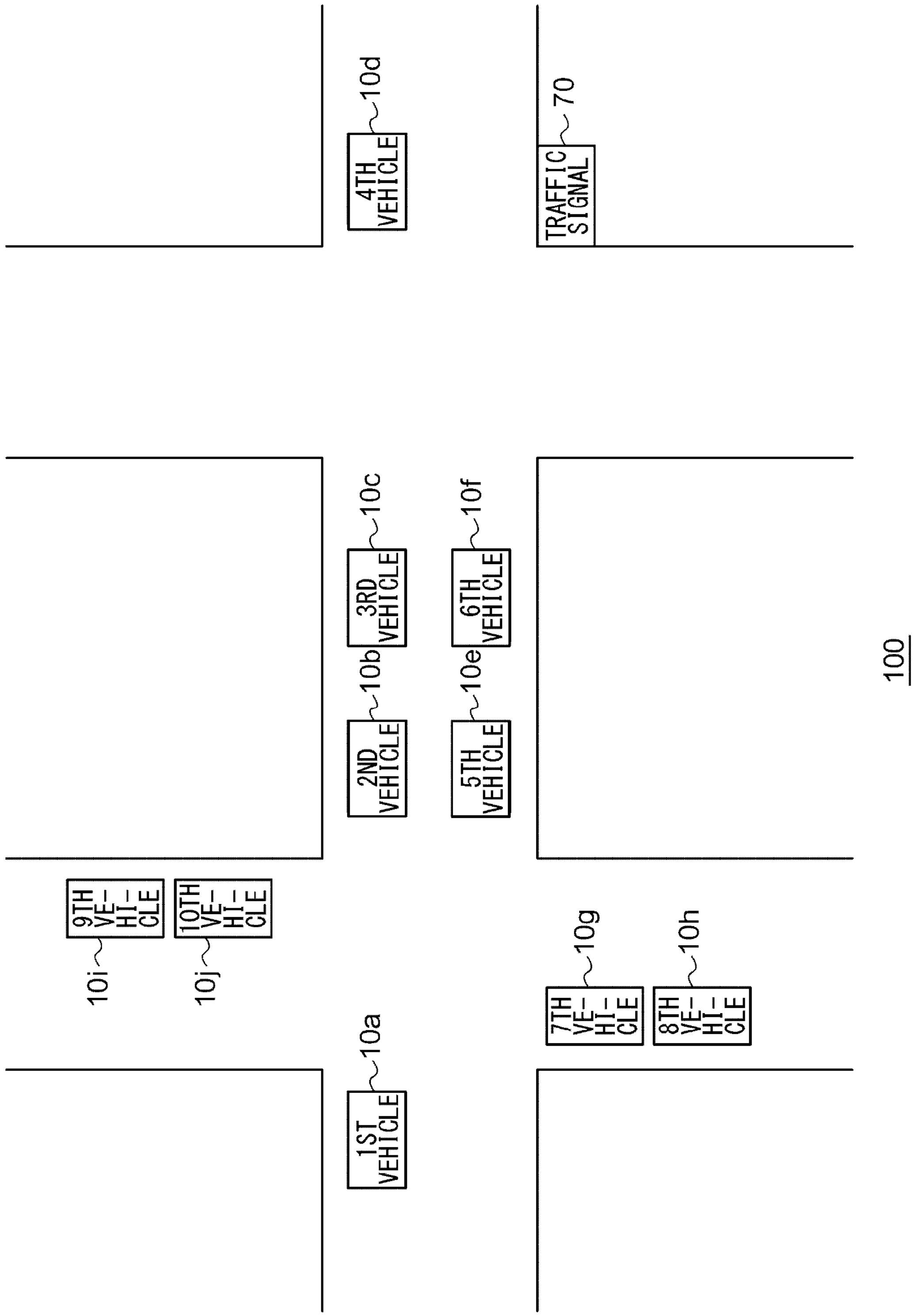
FIG. 1 is a view illustrating a configuration of a communication system according to an embodiment of the present invention.

The invention will now be described by reference to the preferred embodiments. This does not intend to limit the scope of the present invention, but to exemplify the invention.

Before specifically describing the present invention, we describe an outline thereof. An embodiment of the present invention relates to a communication system, which executes data communication between radio apparatuses mounted on vehicles. Hereinafter, for convenience of the description, a transmitting function and a receiving function of the radio apparatus are separately described as a transmitting apparatus and a receiving apparatus, respectively. The transmitting apparatus mounted on a first vehicle stores positional information in a packet signal and broadcast-transmits the packet signal. The receiving apparatus mounted on a second vehicle extracts the positional information from the packet signal and notifies a driver of an approach of the first vehicle. When the number of transmitted packet signals increases, collision probability of the packet signals increases and the receiving apparatus is continuously notified of the approach. In order to respond to this, the transmitting apparatus and the receiving apparatus according to this embodiment execute the following process.

The transmitting apparatus according to this embodiment also acquires information about a right turn and a left turn from a direction indicator (hereinafter, referred to as "traveling direction information"). The transmitting apparatus acquires the positional information when this detects deceleration such that a speed of the first vehicle becomes lower than a threshold. Also, the transmitting apparatus stores map information and confirms whether the positional information approaches an intersection at which a traffic signal is not provided. Herein, information of the intersection at which the traffic signal is not provided and the intersection at which the traffic signal is provided is attached to the map information. When the transmitting apparatus detects that the positional information approaches the intersection at which the traffic signal is not provided, this transmits the packet signal. The positional information and the traveling direction information are stored in the packet signal.

The receiving apparatus acquires the positional information and refers to the map information, thereby predicting the intersection, which the second vehicle will enter. Also, the receiving apparatus predicts presence of the first vehicle, which will enter the intersection in question, based on the positional information stored in the received packet signal. When the receiving apparatus predicts entrance, this predicts whether travel of the first vehicle at the intersection has an effect on the second vehicle based on the traveling direction information stored in the received packet signal. A case in which there is the effect is a case in which the first vehicle merges into a road on which the second vehicle travels in the traveling direction of the same by turning left from a left side of intersecting roads. On the other hand, a case in which there is not the effect is a case in which the first vehicle merges into the road on which the second vehicle travels in a direction opposite to the traveling direction of the same by turning left from a right side of the intersecting roads. When there is the effect, the receiving apparatus notifies the presence of the first vehicle.

FIG. 1 illustrates a configuration of a communication system 100 according to the embodiment of the present invention. The communication system 100 includes a first vehicle 10*a*, a second vehicle 10*b*, a third vehicle 10*c*, a fourth vehicle 10*d*, a fifth vehicle 10*e*, a sixth vehicle 10*f*, a seventh vehicle 10*g*, an eighth vehicle 10*h*, a ninth vehicle 10*i*, and a tenth vehicle 10*j*, which are collectively referred to as vehicles 10, and a traffic signal 70. Herein, the radio apparatus not illustrated is mounted on each vehicle 10. As described above, the radio apparatus is hereinafter described as the transmitting apparatus and the receiving apparatus. Meanwhile, the number of the vehicles 10 is not limited to 10. As illustrated, two roads in a vertical direction, that is to say, in an up-down direction of the drawing intersect with a road in a horizontal direction, that is to say, in a right-left direction of the drawing, and two intersections are illustrated. The traffic signal 70 is provided at a right intersection out of the two intersections. An upper side of the drawing corresponds to the "north", a left side thereof corresponds to the "west", a lower side thereof corresponds to the "south", and a right side thereof corresponds to the "east".

The first to fourth vehicles 10*a* to 10*d* travel from left to right and the fifth and sixth vehicles 10*e* and 10*f* travel from right to left. Also, the seventh and eighth vehicles 10*g* and 10*h* travel from below upward and the ninth and tenth vehicles 10*i* and 10*j* travel from above downward. Herein, the radio apparatus mounted on the first vehicle 10*a* corresponds to the above-described receiving apparatus. Therefore, the first vehicle 10*a* corresponds to the above-described second vehicle. Also, the radio apparatus mounted on the vehicles 10 other than the first vehicle 10*a* corresponds to the above-described transmitting apparatus. Therefore, the vehicles 10 other than the first vehicle 10*a* correspond to the above-described first vehicles.

A plurality of transmitting apparatuses is included in FIG. 1. When each of a plurality of transmitting apparatuses transmits the packet signal, the collision probability of the packet signals might increase. Also, the receiving apparatus notifies the approaches of the vehicles 10 on which the transmitting apparatus is mounted based on the received packet signal. Herein, when a plurality of packet signals is continuously received by the receiving apparatus, the receiving apparatus continuously notifies the approach of the vehicle 10. As a result, it becomes unclear which approach of the vehicle 10 is really dangerous for the driver of the first vehicle 10*a*.

In order to respond to this, the transmitting apparatus acquires the positional information and the traveling direction information of the vehicle 10. When the transmitting apparatus satisfies a predetermined condition, this transmits the packet signal in which the positional information and the traveling direction information are stored. The receiving apparatus acquires the positional information and predicts the intersection, which will be entered. Also, the receiving apparatus predicts the presence of another vehicle 10, which might have the effect on the first vehicle 10*a* when this enters the predicted intersection, based on the received packet signal. When such vehicle 10 is present, the receiving apparatus notifies the approach of the vehicle 10.

Figure 2:
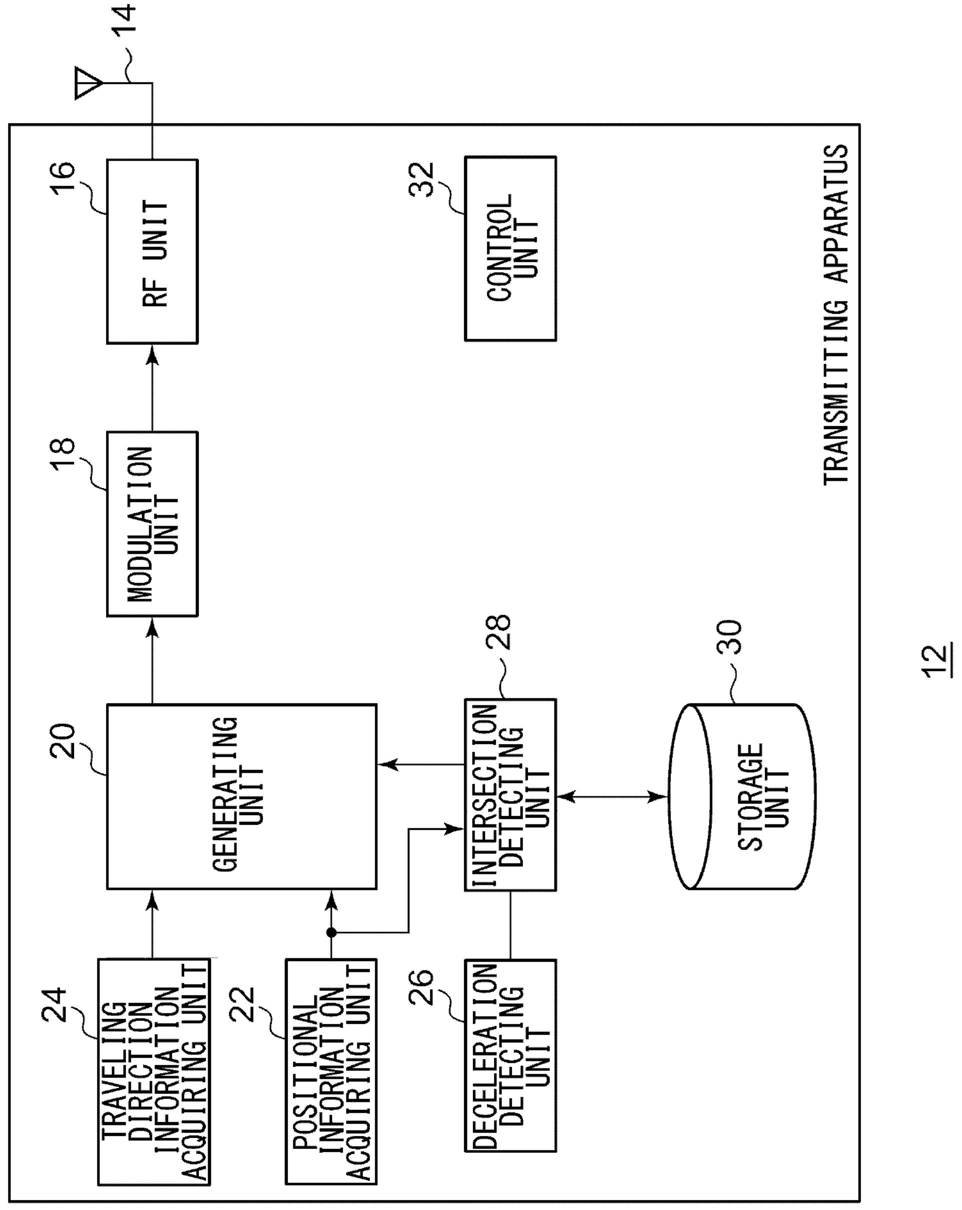
FIG. 2 is a view illustrating a configuration of a transmitting apparatus mounted on a vehicle in FIG. 1.

FIG. 2 illustrates a configuration of the transmitting apparatus 12 mounted on the vehicle 10. The transmitting apparatus 12 includes an antenna 14, an RF unit 16, a modulation unit 18, a generating unit 20, a positional information acquiring unit 22, a traveling direction information acquiring unit 24, a deceleration detecting unit 26, an intersection detecting unit 28, a storage unit 30, and a control unit 32.

The positional information acquiring unit 22 acquires the positional information of the vehicle 10. For example, the positional information acquiring unit 22 is provided with a GPS receiving function to receive a signal from a GPS satellite not illustrated and acquires a position of presence, a moving speed and the like of the vehicle 10 not illustrated, that is to say, the vehicle 10 on which the transmitting apparatus 12 is mounted based on the received signal. Herein, the position of presence, the moving speed and the like are collectively referred to as "positional information" in the following description. Meanwhile, the position of presence is represented by latitude and longitude. The well-known technology may be used to acquire them, so that the description thereof is herein omitted. The positional information acquiring unit 22 may also include a gyroscope, a vehicle speed sensor and the like. The positional information acquiring unit 22 outputs the acquired positional information to the generating unit 20 and the intersection detecting unit 28.

The traveling direction information acquiring unit 24 is connected to the direction indicator of the vehicle 10 to acquire the traveling direction information of the vehicle 10 from the direction indicator. Herein, the traveling direction information is the information about any one of the right turn, the left turn, and straight travel indicated by the direction indicator of the vehicle 10. Meanwhile, the information about the straight travel corresponds to a case in which the right turn and the left turn are not indicated by the direction indicator. The traveling direction information acquiring unit 24 outputs the traveling direction information to the generating unit 20. The generating unit 20 accepts the positional information from the positional information acquiring unit 22 and accepts the traveling direction information from the traveling direction information acquiring unit 24. The generating unit 20 generates the packet signal so as to store the positional information and the traveling direction information. Meanwhile, identification information for identifying the vehicle 10 maybe included in the packet signal.

The deceleration detecting unit 26 is connected to a speed sensor of the vehicle 10 to accept information about a traveling speed from the speed sensor. The deceleration detecting unit 26 monitors a history of the traveling speed. Also, the deceleration detecting unit 26 holds a threshold in advance and compares the traveling speed with the threshold. Herein, the threshold corresponds to a speed to which the vehicle 10 should be decelerated when the vehicle 10 enters the intersection at which the traffic signal is not provided. For example, this is defined as 5 km and 10 km per hour. The deceleration detecting unit 26 sequentially compares the traveling speed with the threshold and detects that the vehicle 10 is decelerated such that the traveling speed becomes lower than the threshold from a case in which the traveling speed is not lower than the threshold. When the deceleration detecting unit 26 detects such deceleration, this outputs the fact to the intersection detecting unit 28.

When the deceleration detecting unit 26 detects the deceleration, the intersection detecting unit 28 accepts a detected result of the deceleration from the deceleration detecting unit 26. The intersection detecting unit 28 accepts the positional information from the positional information acquiring unit 22. The intersection detecting unit 28 refers to the map information stored in the storage unit 30 based on the positional information. The storage unit 30 stores the map information. The map information is represented by the latitude and longitude so as to correspond to the positional information. Also, the information about whether the traffic signal is provided at the intersection is attached to the map information. The intersection detecting unit 28 detects, based on the positional information when accepting the detected result of the deceleration, whether this positional information indicates the vicinity of the intersection at which the traffic signal 70 is not provided by referring to the map information. Herein, the vicinity of the intersection corresponds to an area defined by a predetermined radius from the center of the intersection. The intersection detecting unit 28 outputs the detection of the deceleration in the vicinity of the intersection at which the traffic signal 70 is not provided to the generating unit 20.

When the intersection detecting unit 28 detects the deceleration in the vicinity of the intersection at which the traffic signal 70 is not provided, the generating unit 20 outputs the generated packet signal to the modulation unit 18. The modulation unit 18 executes modulation of the packet signal from the generating unit 20. Further, the modulation unit 18 outputs a modulated result to the RF unit 16 as a baseband packet signal. Herein, the communication system 100 supports an OFDM modulation method and the modulation unit 18 also executes inverse fast Fourier transform (IFFT).

The RF unit 16 inputs the baseband packet signal from the modulation unit 18, executes quadrature modulation and frequency transform of the baseband packet signal, and generates the packet signal at a radio frequency. Also, the RF unit 16 transmits the packet signal at the radio frequency from the antenna 14. The RF unit 16 also includes a power amplifier (PA), a mixer, and a D/A converting unit. Meanwhile, the RF unit 16, the modulation unit 18, and the generating unit 20 execute CSMA when transmitting the packet signal. Specifically described, the RF unit 16 and the like measure interference power by carrier sense. The RF unit 16 and the like estimate a transmission timing based on the interference power. Specifically described, the RF unit 16 stores a predetermined threshold in advance and compares the interference power with the threshold. When the interference power is smaller than the threshold, the RF unit 16 determines the transmission timing. The control unit 32 controls operation of an entire transmitting apparatus 12.

Although the configuration maybe realized by a CPU, a memory, and another LSI of an optional computer in a hardware aspect and is realized by a program loaded on the memory and the like in a software aspect, a functional block realized by combination of them is herein illustrated. Therefore, one skilled in the art may comprehend that the functional block may be realized in various modes only by hardware, or only by software, or combination of them.

Figure 3:
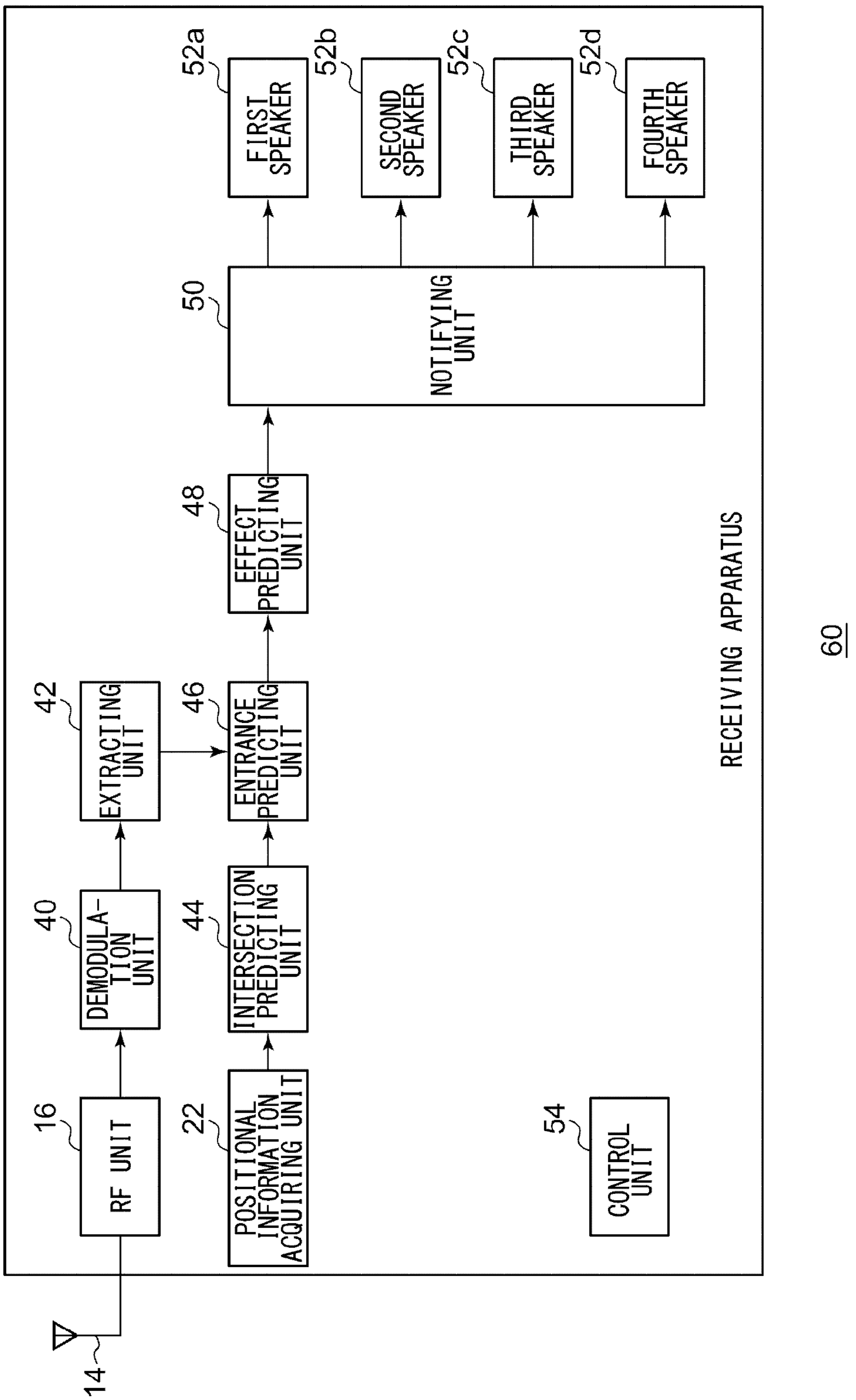
FIG. 3 is a view illustrating a configuration of a receiving apparatus mounted on the vehicle in FIG. 1.

FIG. 3 illustrates a configuration of a receiving apparatus 60 mounted on the vehicle 10. The receiving apparatus 60 includes the antenna 14, the RF unit 16, the positional information acquiring unit 22, a demodulation unit 40, an extracting unit 42, an intersection predicting unit 44, an entrance predicting unit 46, an effect predicting unit 48, a notifying unit 50, a first speaker 52*a*, a second speaker 52*b*, a third speaker 52*c*, and a fourth speaker 52*d* collectively referred to as a speaker 52, and a control unit 54. As described above, although the receiving apparatus 60 is illustrated separately from the transmitting apparatus 12 in FIG. 2, they are integrally composed as the radio apparatus.

The RF unit 16 receives the packet signal at the radio frequency from the transmitting apparatus 12 mounted on another vehicle 10 not illustrated through the antenna 14. Herein, the packet signal includes the positional information of the other vehicle 10, the traveling direction information of the other vehicle 10, and the identification information of the transmitting apparatus 12. The RF unit 16 executes the frequency transform and quadrature detection of the packet signal at the radio frequency received through the antenna 14 to generate the baseband packet signal . Further, the RF unit 16 outputs the baseband packet signal to the demodulation unit 40. In general, the base band packet signal is formed of an in-phase component and a quadrature component, so that two signal lines should be indicated; however, only one signal line is herein indicated for making the drawing clear. The RF unit 16 also includes a low noise amplifier (LNA), the mixer, an AGC, and an A/D converting unit.

The demodulation unit 40 executes demodulation of the baseband packet signal from the RF unit 16. Further, the demodulation unit 40 outputs a demodulated result to the extracting unit 42. The demodulation unit 40 also executes fast Fourier transform (FFT). The extracting unit 42 extracts the positional information, the traveling direction information, and the identification information from the demodulated result. The extracting unit 42 outputs the positional information, the traveling direction information, and the identification information to the entrance predicting unit 46.

The positional information acquiring unit 22 acquires the positional information of the receiving apparatus 60. Since a process by the positional information acquiring unit 22 is similar to that in FIG. 2, the description thereof is herein omitted. The positional information acquiring unit 22 outputs the positional information to the intersection predicting unit 44. The intersection predicting unit 44 accepts the positional information from the positional information acquiring unit 22. The intersection predicting unit 44 associates the positional information with the map information, thereby predicting the intersection, which the vehicle 10 will enter. Specifically described, the map information is composed in the same manner as in the description of the storage unit 30 in FIG. 2. The intersection predicting unit 44 associates the positional information with the road on the map information.

Also, the intersection predicting unit 44 estimates a direction in which the vehicle 10 should travel on the above-described road based on a history of the positional information so far. Also, the intersection predicting unit 44 extracts the intersection, which appears in the estimated direction, by referring to the map information. Extraction of the intersection in this manner corresponds to prediction of the intersection, which will be entered. Meanwhile, when a plurality of intersections appears in the traveling direction, the intersection predicting unit 44 may extract a plurality of intersections. The intersection predicting unit 44 outputs information about the predicted intersection to the entrance predicting unit 46.

The entrance predicting unit 46 accepts the information about the intersection from the intersection predicting unit 44. Also, the entrance predicting unit 46 accepts the positional information, the traveling direction information, and the identification information from the extracting unit 42. As described above, the pieces of information are included in the packet signal from the transmitting apparatus 12 mounted on another vehicle 10 not illustrated. The entrance predicting unit 46 associates the positional information of the other vehicle 10 with the above-described map information, thereby predicting whether the other vehicle 10 enters the intersection predicted by the intersection predicting unit 44. As in the process by the intersection predicting unit 44, the entrance predicting unit 46 associates the other vehicle 10 with the road on the map information based on the positional information from the transmitting apparatus 12. Also, the entrance predicting unit 46 predicts the intersection, which the other vehicle 10 will enter. When the predicted intersection conforms to the intersection accepted from the intersection predicting unit 44, the entrance predicting unit 46 determines that the other vehicle 10 enters the intersection predicted by the intersection predicting unit 44.

When the information about a plurality of intersections is accepted from the intersection predicting unit 44, the entrance predicting unit 46 executes the above-described process for each of a plurality of intersections. Also, when the positional information, the traveling direction information, and the identification information from a plurality of transmitting apparatuses are accepted, the entrance predicting unit 46 classifies the transmitting apparatuses based on the identification information and executes the above-described process for each of the transmitting apparatuses. This corresponds to execution of the above-described process for each of the other vehicles 10. The entrance predicting unit 46 outputs the information about the predicted intersection to the effect predicting unit 48 and also outputs the positional information, the traveling direction information, and the identification information about the vehicle 10, which enters the predicted intersection, to the effect predicting unit 48.

When the entrance of another vehicle 10 is predicted by the entrance predicting unit 46, the effect predicting unit 48 accepts the information about the intersection, the traveling direction information and the like from the entrance predicting unit 46. The effect predicting unit 48 predicts whether the travel of the other vehicle 10 has the effect on this vehicle 10 based on the traveling direction information of the other vehicle 10. Specifically described, it is supposed that this transmitting apparatus 12 is mounted on the first vehicle 10*a* in FIG. 1. The vehicle 10, which merges into the road on which the first vehicle 10*a* travels from a side of the traveling direction of the same, corresponds to the tenth vehicle 10*j*. Regardless of the traveling direction information of the tenth vehicle 10*j*, which is any one of the left turn, the right turn, and the straight travel, a course of the tenth vehicle 10*j* is overlapped with the course of the first vehicle 10*a*. Therefore, the effect predicting unit 48 predicts that the travel of the tenth vehicle 10*j* has the effect on the first vehicle 10*a*.

On the other hand, the vehicle 10, which merges into the road on which the first vehicle 10*a* travels from a right side of the traveling direction of the same, corresponds to the seventh vehicle 10*g*. When the traveling direction information of the seventh vehicle 10*g* is the right turn or the straight travel, the course of the seventh vehicle 10*g* is overlapped with the course of the first vehicle 10*a*. Therefore, the effect predicting unit 48 predicts that the right turn and the straight travel of the seventh vehicle 10*g* have the effect on the first vehicle 10*a*. Meanwhile, when the traveling direction information of the seventh vehicle 10*g* is the left turn, the course of the seventh vehicle 10*g* is not overlapped with the course of the first vehicle 10*a*. Therefore, the effect predicting unit 48 predicts that the left turn of the seventh vehicle 10*g* does not have the effect on the first vehicle 10*a*.

On the other hand, the vehicle 10, which comes from a direction opposite to the traveling direction of the first vehicle 10*a*, corresponds to the fifth vehicle 10*e*. When the traveling direction information of the fifth vehicle 10*e* is the right turn, the course of the fifth vehicle 10*e* is overlapped with the course of the first vehicle 10*a*. Therefore, the effect predicting unit 48 predicts that the right turn of the fifth vehicle 10*e* has the effect on the first vehicle 10*a*. Meanwhile, when the traveling direction information of the fifth vehicle 10*e* is the left turn or the straight travel, the course of the fifth vehicle 10*e* is not overlapped with the course of the first vehicle 10*a*. Therefore, the effect predicting unit 48 predicts that the left turn and the straight travel of the fifth vehicle 10*e* do not have the effect on the first vehicle 10*a*. That is to say, the effect predicting unit 48 predicts whether the course of this vehicle 10 is overlapped with the course of another vehicle 10.

The effect predicting unit 48 also predicts a direction in which there is the effect. This corresponds to derivation of a direction of presence of another vehicle 10 relative to this vehicle 10. Specifically, a first angle is derived by subtracting the latitude and longitude of its own vehicle 10 from the latitude and longitude of the other vehicle 10. The effect predicting unit 48 derives the traveling direction of its own vehicle 10 from a history of the latitude and longitude of its own vehicle 10 and the traveling direction corresponds to a second angle. Further, the effect predicting unit 48 subtracts the second angle from the first angle to derive the relative direction of presence. That is to say, the relative direction of presence is the direction of presence of the other vehicle 10 when the traveling direction is set to 0 degree.

Figure 4:
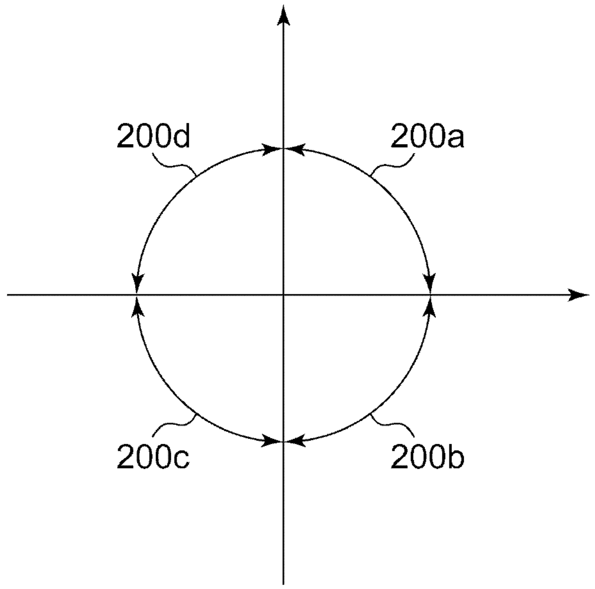
FIG. 4 is a view illustrating areas defined by an effect predicting unit in FIG. 3.

Herein, the effect predicting unit 48 defines a plurality of areas with respect to the direction of presence. FIG. 4 illustrates the areas defined by the effect predicting unit 48. A direction indicated by an up-pointing arrow in the drawing corresponds to 0 degree and a direction indicated by a right-pointing arrow corresponds to 90 degrees. Also, as illustrated, four areas 200, which are first to fourth areas 200*a* to 200*d*, are defined. Herein, each of the areas 200 has the same angle such as 90 degrees and is defined so as not to be overlapped with each other. The first area 200*a* is defined so as to be arranged from 0 to 90 degrees. FIG. 3 is referred to again. The effect predicting unit 48 selects one area 200 in which the derived direction of presence is included out of a plurality of areas 200 defined as in FIG. 4. The effect predicting unit 48 outputs information about another vehicle 10, which has the effect, and the information about the selected area 200 to the notifying unit 50.

Figure 5:
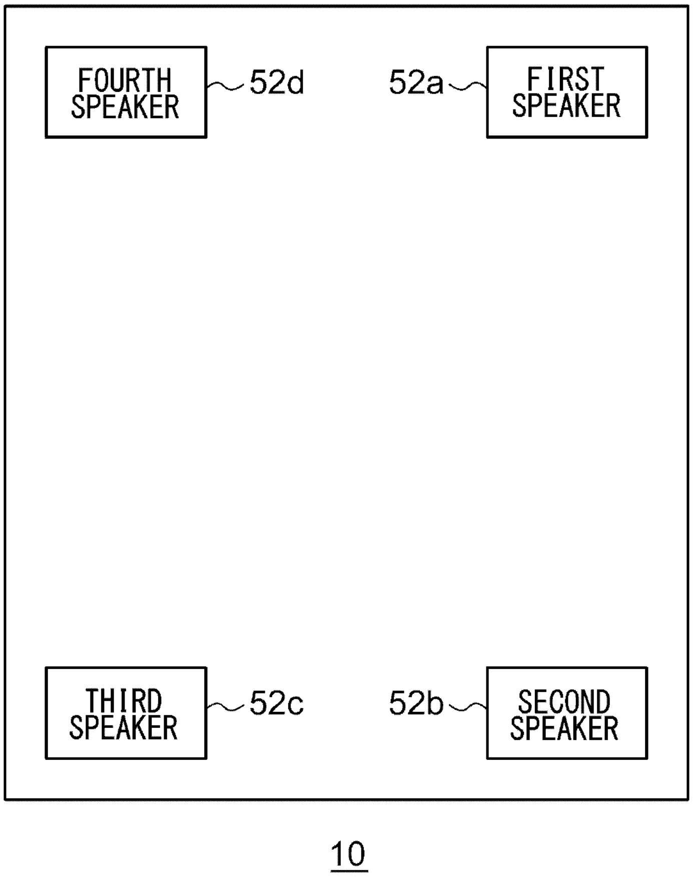
FIG. 5 is a view illustrating arrangement of speakers in FIG. 3.

When the effect predicting unit 48 predicts presence of the effect, the notifying unit 50 accepts the information about another vehicle 10 corresponding to this from the effect predicting unit 48. When the notifying unit 50 accepts the information about the other vehicle 10, this notifies the presence of the other vehicle 10 from the speaker 52. Herein, four speakers 52, which are first to second speakers 52*a* to 52*b*, are provided. FIG. 5 illustrates arrangement of the speakers 52. An upper side of the drawing indicates a front side of the vehicle 10 and a lower side of the drawing indicates a rear side of the vehicle 10. That is to say, the fourth speaker 52*d* is provided on a front left side of the vehicle 10 and the first speaker 52*a* is provided on a front right side of the vehicle 10. Also, the third speaker 52*c* is provided on a rear left side of the vehicle 10 and the second speaker 52*b* is provided on a rear right side of the vehicle 10. FIG. 3 is referred to again.

The notifying unit 50 associates the first area 200*a* in FIG. 4 with the first speaker 52*a* in FIG. 5, associates the second area 200*b* in FIG. 4 with the second speaker 52*b* in FIG. 5, associates the third area 200*c* in FIG. 4 with the third speaker 52*c* in FIG. 5, and associates the fourth area 200*d* in FIG. 4 with the fourth speaker 52*d* in FIG. 5. The notifying unit 50 also accepts the information about the selected area 200 from the effect predicting unit 48. The notifying unit 50 uses the speaker 52 corresponding to the accepted area 200 out of a plurality of speakers 52 mounted on the vehicle 10 for notification. Specifically, when the fourth area 200*d* is accepted, the fourth speaker 52*d* notifies the approach of another vehicle 10. The control unit 54 controls a process of an entire receiving apparatus 60.

Figure 6:
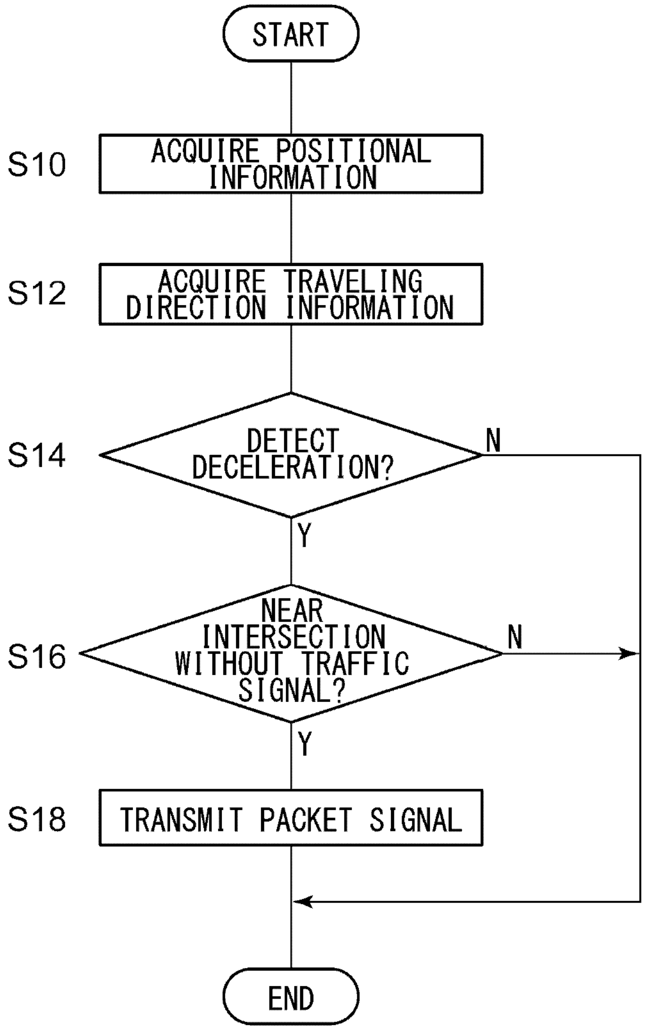
FIG. 6 is a flowchart illustrating a transmission procedure by the transmitting apparatus in FIG. 2.

Operation of the communication system 100 by the above-described configuration is described. FIG. 6 is a flowchart illustrating a transmission procedure by the transmitting apparatus 12. The positional information acquiring unit 22 acquires the positional information (S10). The traveling direction information acquiring unit 24 acquires the traveling direction information (S12). When the deceleration detecting unit 26 detects the deceleration (Y at S14) and the intersection detecting unit 28 detects that it is in the vicinity of the intersection without the traffic signal (Y at S16), the generating unit 20 transmits the packet signal through the modulation unit 18 and the RF unit 16 (S18). On the other hand, when the deceleration detecting unit 26 does not detect the deceleration (N at S14), or when the intersection detecting unit 28 does not detect that it is in the vicinity of the intersection without the traffic signal (N at S16), the process is finished.

Figure 7:
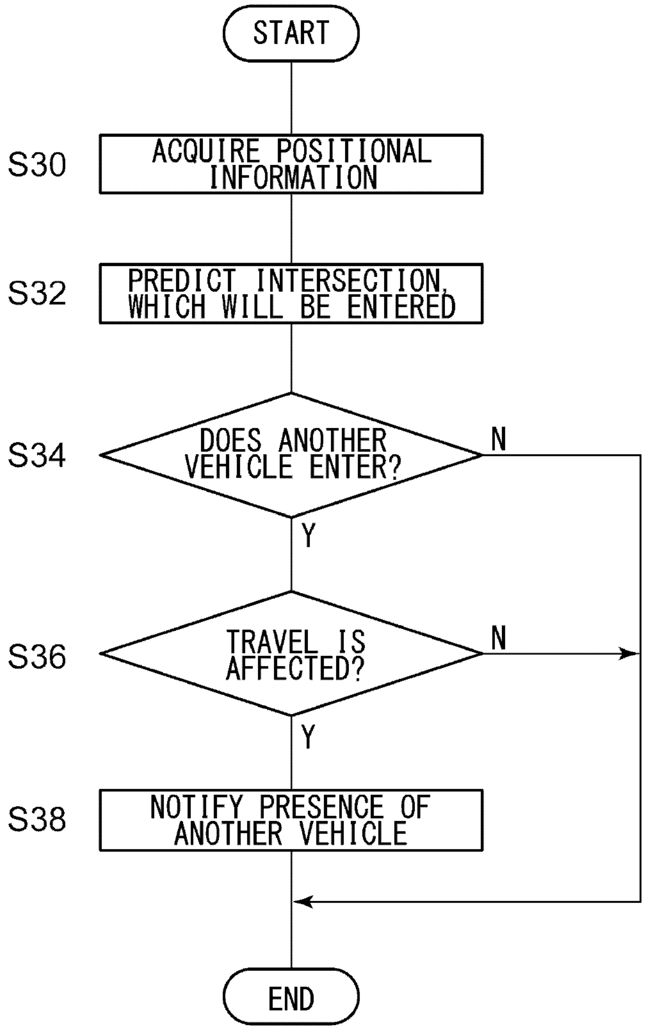
FIG. 7 is a flowchart illustrating a notification procedure by the receiving apparatus in FIG. 3.

FIG. 7 is a flowchart illustrating a notification procedure by the receiving apparatus 60. The positional information acquiring unit 22 acquires the positional information (S30). The intersection predicting unit 44 predicts the intersection, which will be entered (S32). When the entrance predicting unit 46 predicts that another vehicle 10 enters (Y at S34) and the effect predicting unit 48 predicts that there is the effect on the travel (Y at S36), the notifying unit 50 notifies the presence of the other vehicle 10 (S38). On the other hand, when the entrance predicting unit 46 does not predict that another vehicle 10 enters (N at S34), or when the effect predicting unit 48 does not predict that there is the effect on the travel (N at S36), the process is finished.

According to the embodiment of the present invention, since the packet signal in which the positional information and the traveling direction information are stored is transmitted, not only the positional information but also a travel schedule by any one of the right turn, the left turn, and the straight travel may be notified. Also, since the packet signal is transmitted when it is decelerated, it is possible to avoid the transmission of the packet signal during the travel on the straight road, for example. Also, since the transmission of the packet signal during the travel on the straight road is avoided, it is possible to decrease traffic of the packet signals. Also, since the traffic of the packet signals is decreased, it is possible to decrease the collision probability of the packet signals. Also, since the packet signal is transmitted in the vicinity of the intersection without the traffic signal, it is possible to notify the receiving apparatus that this is present at a position at which risk of a collision accident is high. Also, since the receiving apparatus is notified that this is present at the position at which the risk of the collision accident is high, it is possible to alert the driver of the vehicle on which the receiving apparatus is mounted.

Also, since the vehicle entering the intersection, which will be entered, is made a target of the notification, it is possible to decrease the number of notification targets. Also, since only the vehicle, which has the effect on the travel of this vehicle, out of the vehicles entering the intersection, which will be entered, is made the notification target, it is possible to decrease the number of the notification targets. Also, since the number of the notification targets is decreased, it is possible to decrease occurrence probability of a status in which the notification is continuously performed. Also, since the occurrence probability of the status in which the notification is continuously performed is decreased, it is possible to alert the driver. Also, since the notification is output from the speaker in the direction of the approach of another vehicle, the driver may easily recognize the direction of the approach of the other vehicle. Also, since the driver may easily recognize the direction of the approach of the other vehicle, it is possible to improve safety.

The present invention is described above based on the embodiment. The embodiment is illustrative only and one skilled in the art may comprehend that various modifications of combination of each component and each process are possible and that the modifications are within the scope of the present invention.

In the embodiment of the present invention, the notifying unit 50 outputs the notification from any one of a plurality of speakers 52 according to the direction of presence of another vehicle 10. However, this is not limitation, and the notifying unit 50 may output the notification from a predetermined speaker 52 regardless of the direction of presence of the other vehicle 10, for example. According to the modification, the process may be made simple.

In the embodiment of the present invention, when notifying the approach of another vehicle 10, the notifying unit 50 does not take into account a degree of risk of each of the other vehicles 10. However, this is not the limitation, and the notifying unit 50 may notify by taking into account the degree of risk of each of the other vehicles 10, for example. In this case, the effect predicting unit 48 derives the moving speed of the other vehicle 10. The moving speed is derived based on change with time of the latitude and longitude of the other vehicle 10, for example. When the moving speed is not higher than the threshold, the notifying unit 50 notifies the approach only by monitor display without using the speaker 52 considering that the degree of risk of the other vehicle is low. On the other hand, when the moving speed is higher than the threshold, the notifying unit 50 notifies the approach also by the speaker 52 in addition to the monitor display considering that the degree of risk of the other vehicle is high. That is to say, the notifying unit 50 estimates the degree of risk of the other vehicle 10 being a target of prediction by the effect predicting unit 48 and notifies the presence of the other vehicle 10 while changing a mode of the notification according to the degree of risk of the other vehicle 10 estimated. Herein, a notifying means is added as the degree of risk becomes higher. According to this modification, the notifying means is changed according to the degree of risk of the other vehicle 10, so that it is possible to notify the driver of the degree of risk of the other vehicle 10, too.

Such modification may be further modified as follows. The notifying unit 50 may use not the moving speed of another vehicle 10 but a type of the other vehicle 10 as the degree of risk of the other vehicle 10. For example, the notifying unit 50 specifies that the degree of risk is high when the other vehicle 10 is an emergency vehicle. Herein, when information indicating that this is the emergency vehicle is included in the packet signal, the notifying unit 50 recognizes that the other vehicle 10 is the emergency vehicle. Also, a timing at which the emergency vehicle should transmit the packet signal and a timing at which a general vehicle should transmit the packet signal are different from each other, and when the packet signal is received at the former timing, the notifying unit 50 recognizes that the other vehicle 10 is the emergency vehicle. Meanwhile, it is also possible to specify that the degree of risk is low when the other vehicle 10 is the emergency vehicle. Also, the notifying unit 50 may notify the approach only by the speaker 52 without executing the monitor display considering that the degree of risk of the other vehicle is high when the moving speed is higher than the threshold. Further, it is possible that the degree of risk is classified into not only two stages but also more stages. At that time, the notifying means differs according to the stage of the degree of risk.

What is claimed is:

1. A radio apparatus mounted on a vehicle, comprising:

an acquiring unit configured to acquire positional information of the vehicle;

a first predicting unit configured to predict an intersection, which the vehicle will enter, by associating positional information acquired by the acquiring unit and map information;

a second predicting unit configured to predict whether another vehicle enters the intersection predicted by the first predicting unit by acquiring the positional information of the other vehicle included in a packet signal from another radio apparatus mounted on the other vehicle and associating the positional information of the other vehicle with the map information;

a third predicting unit configured to predict whether travel of the other vehicle has an effect on this vehicle based on traveling direction information of the other vehicle acquired from the packet signal when the second predicting unit predicts entrance of the other vehicle; and a notifying unit configured to notify presence of the other vehicle when the third predicting unit predicts presence of the effect, wherein the third predicting unit predicts whether travel of the other vehicle has an effect on this vehicle by predicting whether the course of this vehicle is overlapped with the course of the other vehicle.

2. The radio apparatus according to claim 1, wherein the third predicting unit also predicts a direction of the effect, and the notifying unit uses a speaker corresponding to the direction predicted by the third predicting unit out of a plurality of speakers mounted on the vehicle for notification.

3. A radio apparatus mounted on a vehicle, comprising:

an acquiring unit configured to acquire positional information of the vehicle;

a first predicting unit configured to predict an intersection, which the vehicle will enter, by associating positional information acquired by the acquiring unit and map information;

a second predicting unit configured to predict whether another vehicle enters the intersection predicted by the first predicting unit by acquiring the positional information of the other vehicle included in a packet signal from another radio apparatus mounted on the other vehicle and associating the positional information of the other vehicle with the map information;

a third predicting unit configured to predict whether travel of the other vehicle has an effect on this vehicle based on traveling direction information of the other vehicle acquired from the packet signal when the second predicting unit predicts entrance of the other vehicle;

a notifying unit configured to notify presence of the other vehicle when the third predicting unit predicts presence of the effect; and an estimating unit configured to estimate a degree of risk of the other vehicle, which is made a target of prediction by the third predicting unit, wherein the notifying unit notifies the presence of the other vehicle while changing a mode of the notification according to the degree of risk of the other vehicle estimated by the estimating unit.

4. A radio apparatus mounted on a vehicle, comprising:

a first acquiring unit configured to acquire positional information of the vehicle;

a second acquiring unit configured to acquire traveling direction information of the vehicle;

a generating unit configured to generate a packet signal based on the positional information acquired by the first acquiring unit and the traveling direction information acquired by the second acquiring unit;

a first detecting unit configured to detect that the vehicle is decelerated such that a traveling speed of the vehicle becomes lower than a threshold;

a second detecting unit configured to detect whether the positional information acquired by the first acquiring unit indicates the vicinity of an intersection at which a traffic signal is not provided when the first detecting unit detects deceleration; and a communicating unit configured to transmit the packet signal generated by the generating unit when the second detecting unit detects the deceleration in the vicinity of the intersection at which the traffic signal is not provided, wherein the threshold in the first detecting unit corresponds to a speed to which the vehicle should be decelerated when the vehicle enters the intersection at which the traffic signal is not provided.

5. The radio apparatus according to claim 1, wherein the third predicting unit defines a plurality of areas with respect to the direction of presence of the other vehicle relative to the traveling direction of this vehicle set to 0 degree, and predicts which area includes a direction in which there is an effect, and the notifying unit uses for notification a speaker corresponding to the direction predicted by the third predicting unit out of a plurality of speakers mounted on the vehicle and associated one-to-one with the areas.

6. The radio apparatus according to claim 1, wherein the traveling direction information includes information about a right turn, a left turn, or straight travel.

7. The radio apparatus according to claim 3, wherein the third predicting unit also predicts a direction of the effect, and the notifying unit uses a speaker corresponding to the direction predicted by the third predicting unit out of a plurality of speakers mounted on the vehicle for notification.

8. The radio apparatus according to claim 3, wherein the third predicting unit defines a plurality of areas with respect to the direction of presence of the other vehicle relative to the traveling direction of this vehicle set to 0 degree, and predicts which area includes a direction in which there is an effect, and the notifying unit uses for notification a speaker corresponding to the direction predicted by the third predicting unit out of a plurality of speakers mounted on the vehicle and associated one-to-one with the areas.

9. The radio apparatus according to claim 3, wherein the traveling direction information includes information about a right turn, a left turn, or straight travel.

10. The radio apparatus according to claim 4, wherein the traveling direction information includes information about a right turn, a left turn, or straight travel.

* * * * *